2 Sheets—Sheet 1.

J. T. WEST.
Bars for Connecting the Hoes of Grain-Drills.

No. 219,046.          Patented Aug. 26, 1879.

Witnesses:
Frank Pardon
C. Hewitt

Inventor:
John T. West
by J. G. Hewitt
Attorney

J. T. WEST.
Bars for Connecting the Hoes of Grain-Drills.

No. 219,046. Patented Aug. 26, 1879.

UNITED STATES PATENT OFFICE.

JOHN T. WEST, OF ALLENSVILLE, KENTUCKY.

IMPROVEMENT IN BARS FOR CONNECTING THE HOES OF GRAIN-DRILLS.

Specification forming part of Letters Patent No. 219,046, dated August 26, 1879; application filed January 21, 1879.

*To all whom it may concern:*

Be it known that I, JOHN T. WEST, of Allensville, in the county of Todd and State of Kentucky, have invented a certain new and useful Improvement in Bars or Links for Connecting the Hoes of a Hoe Grain-Drill with the Springs of a Spring or Slide Drill; and I do hereby declare that the following is a full, clear, and exact description of the construction and operation of the same, reference being had to the accompanying drawings, forming part of this specification, and to the letters of reference marked thereon.

Figure 1:
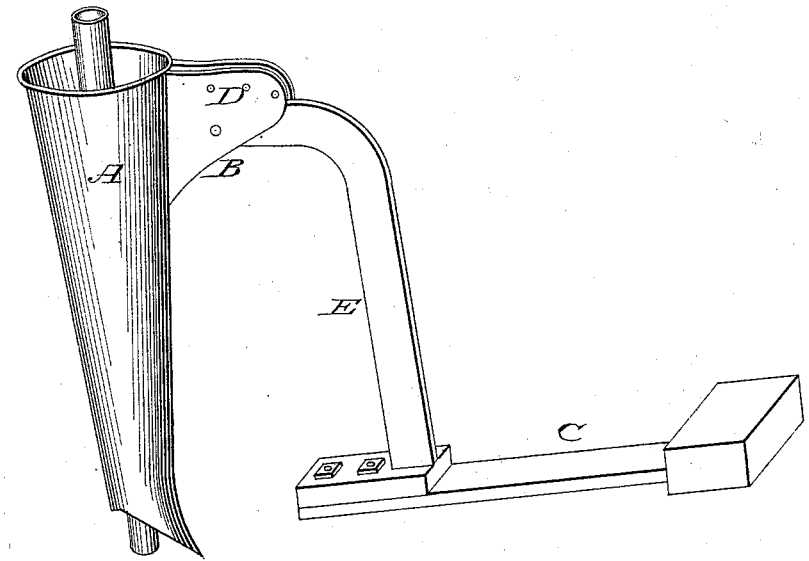
Figure 2:
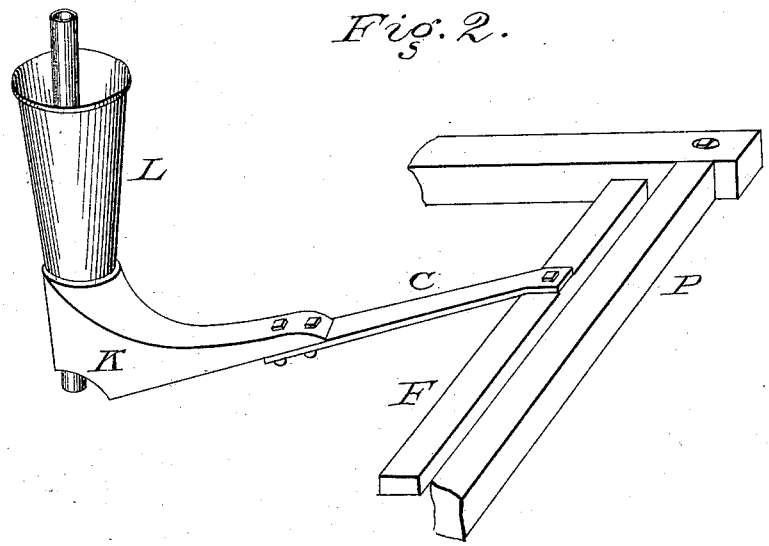
Figure 3:
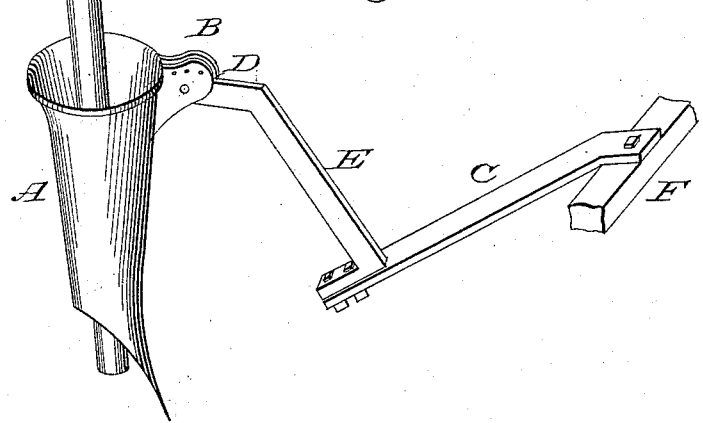

Figure 1 is a perspective view of the device, showing its general construction. Fig. 2 is a perspective view, showing the shield, drag-cutter, and spring of a class of the drills convertible into hoe-drills by means of the hoe and bar E. Fig. 3 is a perspective view, showing how a slide-drill as shown in Fig. 2 is converted into a hoe-drill by means of the bar E.

This my invention relates to a certain new and useful improvement in bars or links for connecting the hoes of a hoe grain-drill with the springs of a spring or slide drill; the object of which is to provide a means for converting a spring or slide grain-drill into a hoe-drill, which is done by simply removing the shoes or slides of the slide or spring drill, and substituting the hoes of a hoe-drill in their places when a change is necessary, thereby converting it into a hoe-drill without being at the cost of having a complete machine of each kind, it being only necessary to have a slide-drill complete and a set of hoes belonging to the hoe-drill, or like the hoes of other such drills, and, when necessary to make the change, remove the shoes of the slide-drill and attach the hoes of the kind used on hoe-drills to the springs of the slide-drill, which is done by means of a square or flat bar of metal or wood, made in form as shown in the drawings, or in any suitable form to attain the same result, one end of which is secured to the springs by means of bolts, while the other extends up and connects with the lugs on the upper end of the hoe-socket by a bolt, loosely or in such manner as to turn back in case of obstruction sufficient to cause damage to the hoes, they being held in position only by means of wooden pins through the jaws above the bar, which would break by the strain before damaging the hoes, and thereby relieve them gradually without jerking, the hoe being so connected with the springs as to cause them to rise over obstructions before breaking the hoe or pins.

This my invention will be more fully illustrated in detail in the drawings, in which—

A represents the socket or hoe of a hoe grain-drill, which is made somewhat in form as shown in the drawings B is a lug or jaws, near the top part, to receive the end of the bar E, which connects it with springs C of the slide-drill. D are small holes through the upper part of the jaws B, in which a wooden pin is inserted to hold the hoe in position while in operation. E is the connecting link or bar, which is made of square or flat iron, and in form as shown in the drawings, with one end secured to the spring of a slide-drill by means of bolts or otherwise, while the other enters the jaws B of the hoe-socket, and is secured therein by a bolt through the jaws in such a manner as to permit the hoe to turn back in case of obstruction.

When the hoe has a single lug it is necessary that the connecting bar or link be made forked, with the hoe-lug hinged between the parts so as to turn back.

F represents a section of the hinged or pressure bar of a spring-drill, by means of which pressure on the hoe is regulated.

L is the shield or socket of a drag grain-drill, which is intended only to show one of a class of drills intended to be converted into hoe-drills by means of the bar E, which is done by unscrewing the cutter K, with its shield L, from the spring C, and substituting the bar E, with its hoe A, when the machine becomes a hoe-drill.

K is the slide-cutter of a drag-drill, which is secured to the spring by means of bolts.

C is the spring of a drag-drill, to which the bar E is secured in order to convert it into a hoe-drill.

Having thus fully described the nature and object of this my invention, what I claim as new, and desire to secure by Letters Patent in grain-drills, is—

The bar E, for connecting the hoes of a hoe grain-drill with the springs of a spring or slide drill, substantially as herein described, and for the purpose set forth.

JOHN THOMAS WEST.

Witnesses:
W. D. BOYER,
E. L. MALLORY.